United States Patent [19]

Rasor et al.

[11] 4,406,386
[45] Sep. 27, 1983

[54] ARTICLE CARRIER AND A BRACKET THEREFOR

[75] Inventors: William Rasor, Marysville; Gary M. Cronce, Port Huron, both of Mich.

[73] Assignee: Masco Corporation, Taylor, Mich.

[21] Appl. No.: 251,514

[22] Filed: Apr. 6, 1981

[51] Int. Cl.³ .............................................. B60R 9/04
[52] U.S. Cl. .................................. 224/321; 224/325; 248/297.2
[58] Field of Search ............. 248/297.2, 297.3, 316 B, 248/503; 224/324, 321, 315, 320, 325, 309, 319

[56] References Cited

U.S. PATENT DOCUMENTS

| 666,099 | 1/1901 | Kepler | 248/297.2 |
| 2,736,100 | 2/1956 | Landau | 248/297.2 |
| 4,132,335 | 1/1979 | Ingram | 224/324 |
| 4,170,315 | 10/1979 | Dubach et al. | 220/339 |
| 4,295,588 | 10/1981 | Kowalski et al. | 224/325 |
| 4,323,034 | 4/1982 | Carlson | 248/297.2 |

Primary Examiner—Allen N. Shoap
Assistant Examiner—Robert Petrik
Attorney, Agent, or Firm—E. Dennis O'Connor; Steven L. Permut; Leon E. Redman

[57] ABSTRACT

An article carrier for mounting on a substantially flat exterior surface of a motor vehicle and a bracket for the article carrier. The article carrier has two slats secured to the surface in a spaced apart, parallel relationship. One bracket is removably fastened to each of the slats. A movable fastening member depending from each bracket selectively secures the bracket in a fixed position along the corresponding slat. The article carrier also includes a transverse rail fastened at each of its end to one of the brackets.

5 Claims, 6 Drawing Figures

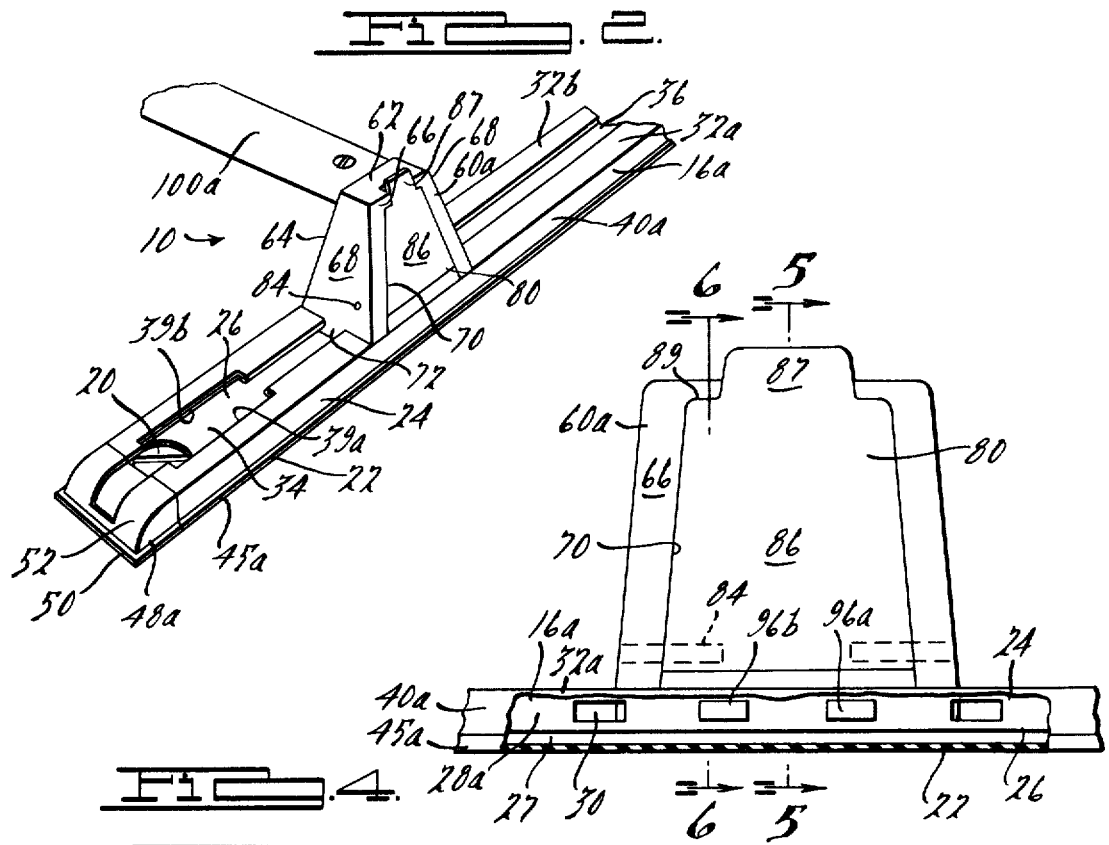
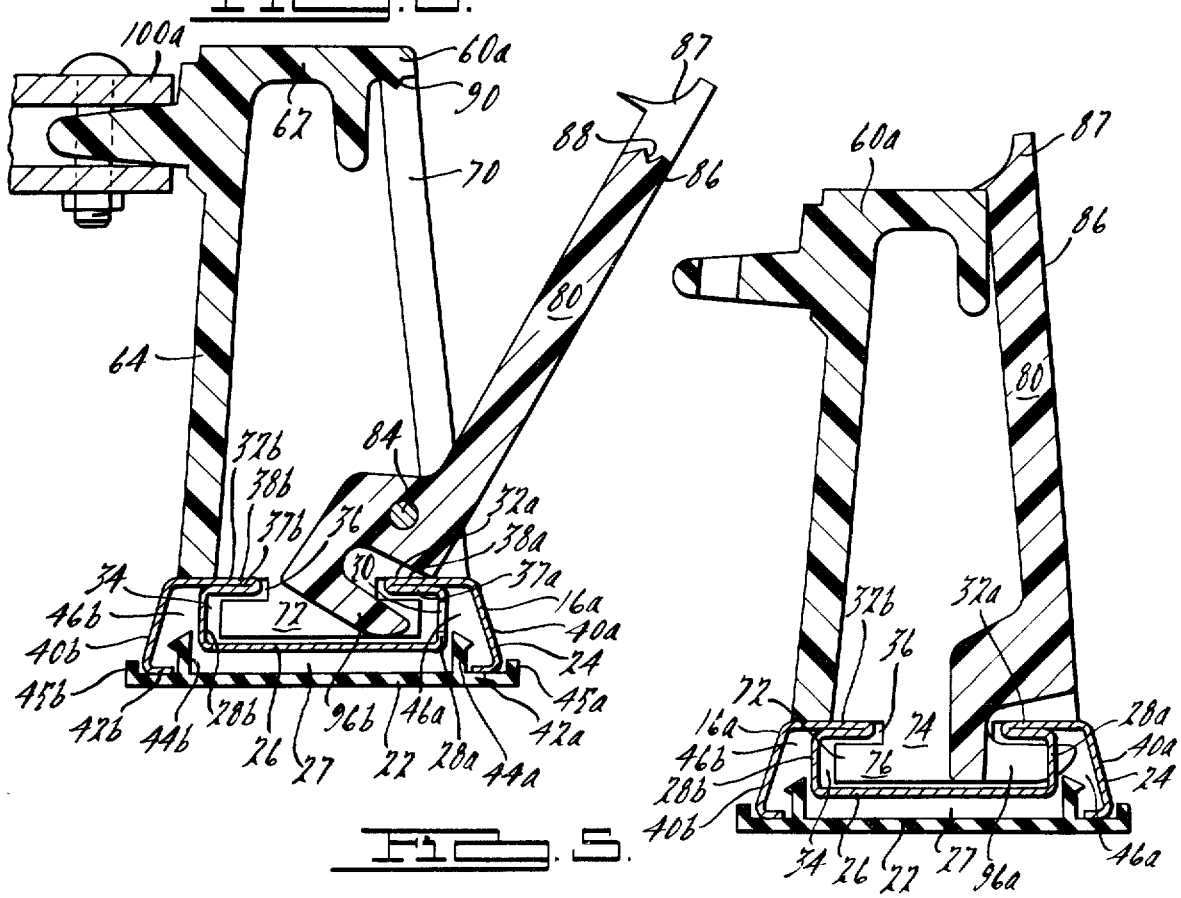

ARTICLE CARRIER AND A BRACKET THEREFOR

BACKGROUND

The present invention relates to article carriers and to brackets therefor and more particularly relates to multiple rail article carriers and to movable brackets therefor.

Luggage racks, ski racks, bicycle carriers, and similar carriers adapted to be mounted to the exterior sheet metal of motor vehicles are well known and have been disclosed in various forms. Many comprise two or more longitudinal slat assemblies fastened to the trunk or to the roof or to a similar flat exterior sheet metal surface of a motor vehicle in a spaced apart parallel relationship. Two or more transverse rails are supported above the sheet metal surface by brackets mounted to the slat assemblies.

Some of these article carriers have movable brackets supporting the transverse rails. These brackets allow adjustment of the spacing between transverse rails. Examples of such article carriers include those disclosed in U.S. Pat. Nos. 3,253,755 (issued May 31, 1966), 3,554,416 (issued Jan. 12, 1971), 4,099,658 (issued July 11, 1978), 4,106,680 (issued Aug. 15, 1978), and 4,132,335 (issued Jan. 2, 1979). While such brackets may work satisfactorily, some involve a substantial number of components and are subject to a considerable amount of wear, particularly where threaded members are used to lock the brackets in position.

The environment in which such article carriers are used is far from ideal. They are subject to vibrations, to moisture, and to a wide range of temperatures. Furthermore, they must endure road dirt and atmospheric contaminants. Many of the locking mechanisms of the brackets of previous article carriers have critical components, such as threaded members, exposed to these environmental conditions. These locking mechanisms are therefore likely to malfunction after repeated cycles of locking and unlocking and after a prolonged period of exposure to these conditions.

It is an object of the present invention to provide an article carrier having a movable bracket comprised of relatively few parts. It is another object of the present invention to provide a movable bracket for an article carrier which bracket is not susceptible to vibrating loose or becoming loose after repeated cycles of locking and unlocking. It is a further object of the present invention to provide a movable bracket for an article carrier that permits rapid removal of the brackets and the transverse rails when the article carrier is not in use. Finally, it is an object of the present invention to provide a movable bracket for an article carrier which bracket may be reliably locked in position with a minimum amount of effort by the operator.

SUMMARY

The present invention provides an article carrier for mounting on a flat exterior surface of a motor vehicle and a movable bracket for supporting a transverse rail for the article carrier. The article carrier has two slats or slat assemblies fixedly secured to the surface in a spaced apart, parallel relationship. Each slat assembly extends longitudinally along the surface. Each of the slat assemblies has at least one longitudinal rib means defining a track.

At least two brackets are provided, one of the brackets being fastened to the rib means of each slat assembly. Each bracket slides along the rib means and is removable at the end of the slat assembly. Each bracket has a selectively movable fastening member. Each slat assembly preferably has a longitudinal series of detents. The fastening member is selectively engaged with any preselected one of the detents and thereby secures the bracket in position along the slat assembly.

One or more transverse rails are provided. Each rail is supported between a bracket on one of said slat assemblies and a bracket on the other of said slat assemblies. The rails are perpendicular to the slat assemblies and are disposed spacially above the surface of the vehicle.

BRIEF DESCRIPTION OF THE DRAWING

FIG. 2 is an enlarged perspective view of a portion of the article carrier of FIG. 1 showing a portion of one slat assembly, one bracket, and a portion of one rail;

FIG. 4 is a side elevational view, with parts cutaway, showing the bracket and a portion of the slat assembly of FIG. 3;

FIG. 5 is a sectional view taken along line 5—5 of FIG. 4 and showing the bracket in the raised, locked, movement preventing position; and FIG. 6 is a sectional view taken along line 6—6 of FIG. 4 and showing the bracket in the lowered, unlocked, movement permitting position.

DETAILED DESCRIPTION OF THE PREFERRED EMBODIMENT

Figure 1:
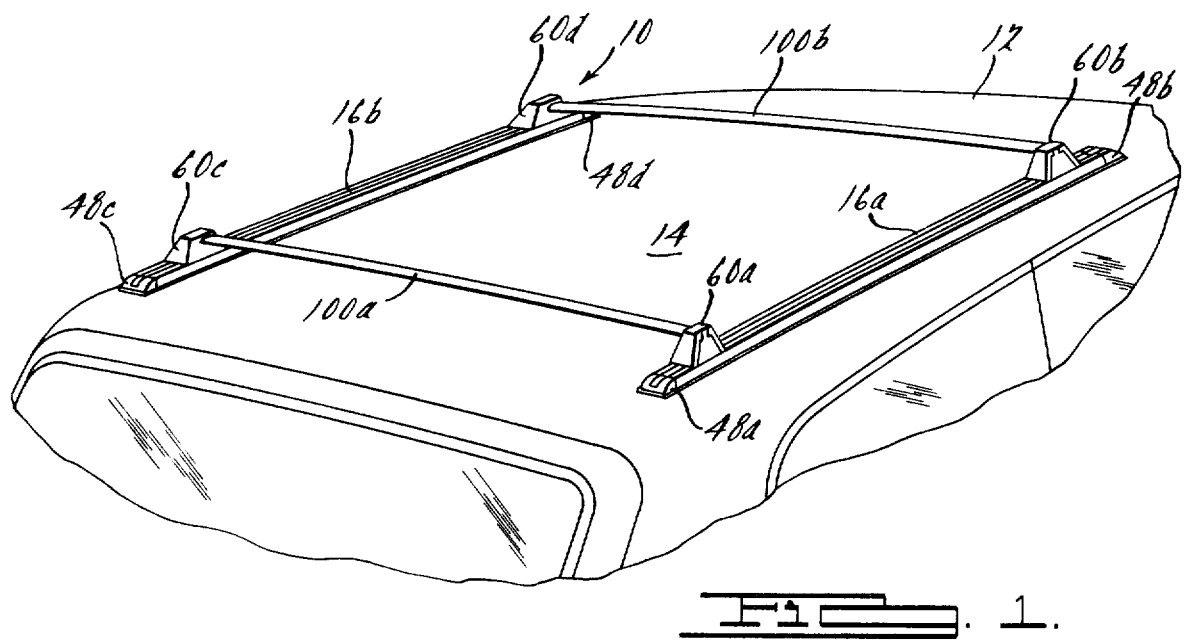
FIG. 1 is a perspective view of the preferred embodiment of the article carrier of the present invention affixed to the roof of a motor vehicle.
Figure 3:
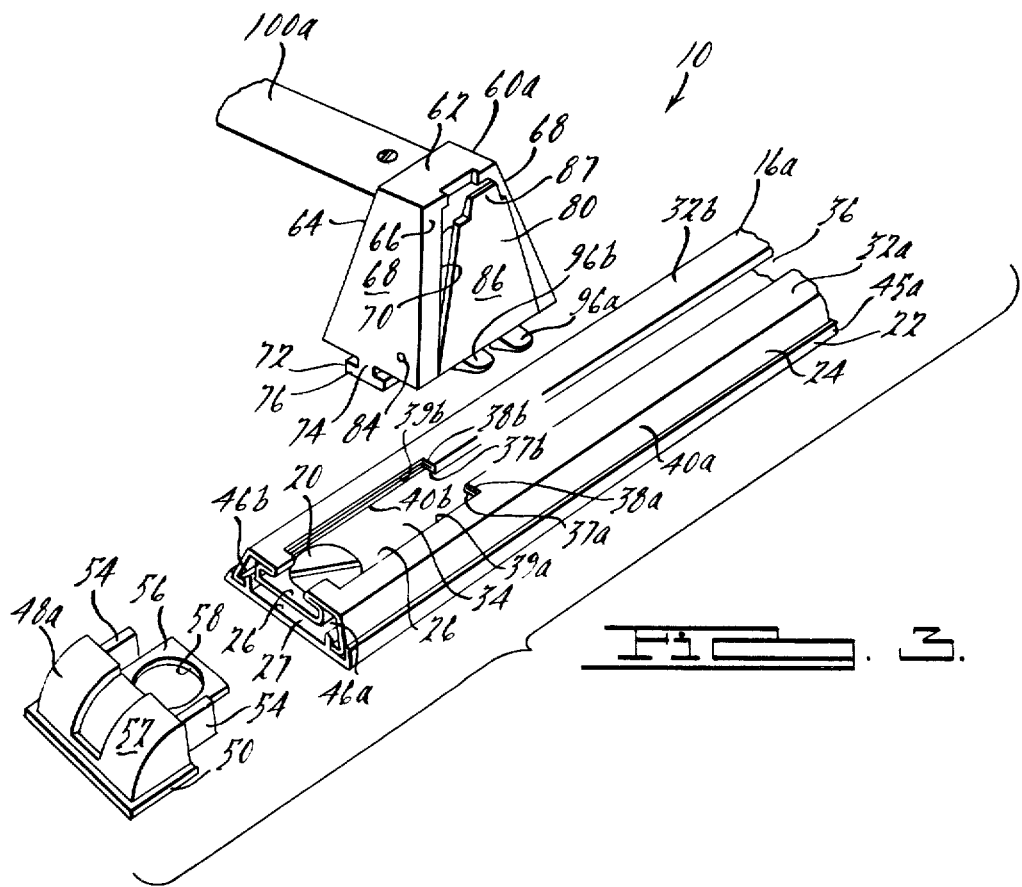
FIG. 3 is an exploded perspective partial view of the elements illustrated in FIG. 2.

FIGS. 1, 2, and 3 of the drawing illustrate an example of an article carrier 10 according to the present invention. As best shown in FIG. 1, the article carrier 10 is mounted on an exterior sheet metal surface of a motor vehicle 12. In the illustration, the article carrier 10 is shown mounted on the roof 14 of the motor vehicle 12.

The article carrier 10 has two identical slat assemblies 16a and 16b. The slat assemblies 16a and 16b extend longitudinally of the vehicle 12, are laterally spaced and are positioned parallel to each other. Each of the slat assemblies 16a and 16b are fastened to the roof 14 by screws 20 (FIG. 2). The construction of the slat assemblies 16a and 16b is best shown in FIGS. 5 and 6 which illustrate the slat assembly 16a in cross section. The slat assembly 16a has two components, a substantially flat lower member or runner 22 and an upper member or track 24. The runner 22 preferably is comprised of an extruded plastic. The runner 22 rests on the roof 14 of the motor vehicle 12.

The track 24 is one piece and is formed from a single sheet metal stamping of roll formed steel. The track 24 has a substantially flat longitudinally extending central portion or base 26 disposed above the runner 22. A gap 27 is provided between the base 26 and the runner 22. A pair of longitudinal inner webs 28a and 28b extend upwardly from the base 26, each inner web 28a and 28b extending from one side edge of the base 26. A plurality of rectangular and spaced apart detent apertures 30, as shown in FIG. 4, are provided in a linear series along the entire length of one (28a) of the inner webs.

A pair of coplanar longitudinal ribs 32a and 32b are provided. As shown in FIG. 6 for the rib 32b, each of the ribs 32a and 32b comprises a lower horizontal portion 37a or 37b of the sheet metal of the track 24 extending inwardly from the upper end of one of the inner webs 28a and 28b. Each of the ribs 32a and 32b further comprises an upper horizontal portion 38a or 38b (FIG. 5) of the sheet metal of the track 24 bent back over the corresponding lower horizontal portion 37a or 37b and extends outwardly therefrom. A portion 39a or 39b (FIGS. 2 and 3) of each of the ribs 32a and 32b is notched at one end of each of the tracks 24 to allow removal of brackets described immediately below.

It should be noted that a longitudinal slideway cavity 34 (FIGS. 2, 3, 5 and 6) surrounded by the base 26, the inner webs 28a and 28b and the ribs 32a and 32b is thereby formed in the track 24. The slideway cavity 34 is open at a gap 36 between the ribs 28a and 28b. The base 26, the webs 28a and 28b and the ribs 32a and 32b define an upwardly oriented C-shaped track.

An outer web 40a (FIGS. 5 and 6) extends downwardly from the outermost edge of the upper portion 38 of the rib 32a. A longitudinal gap 46a is provided between the inner web 28a and the outer web 40a. An outer web 40b extends downwardly from the outermost edge of the upper portion of the rib 32b. A longitudinal gap 46b similar to the gap 46a is provided between the inner web 28b and the outer web 40b.

Referring to FIG. 6, a longitudinal lip 42a is formed at the edge of the sheet metal of the track 24 at the lower end of outer web 40a. The lip 42a cooperates with a pair of longitudinal flanges 44a and 45a of the runner 22 to loosely attach the members 22 and 24 together. Similarly, a lip 42b formed at the lower edge of the web 40b cooperates with flanges 44b and 45b of the runner 22.

The second slat assembly 16b is identical to the slat assembly 16a described above except that the detent apertures 30 (FIG. 4) are on the opposite inner web (28b).

As best illustrated in FIG. 1, four identical end caps 48a, 48b, 48c, and 48d are provided. One of the end caps 48a, 48b, 48c or 48d is inserted in each end of each of the slat assemblies 16a and 16b. The end caps reduce wind noise when the motor vehicle 12 is in motion and have aesthetic value as well.

One representative end cap, end cap 48a, is shown in FIG. 3. The end cap 48a consists of a molded plastic unit having a rectangular base portion 50 and a wedge portion 52 above the base portion 50.

The end cap 48a is removably affixed to the slat assembly 16a by means of the screw 20, described above. Each of a pair of vertical snap tabs 54 extends from the wedge portion 52. Each snap tab 54 is inserted into one of the two gaps 46a and 46b respectively (FIGS. 3, 5 and 6) between the inner webs 28a and 28b and outer webs 40a and 40b, respectively, of the track 24. The end cap 48a is also provided with a horizontal tab 56 extending from its base portion 50 and insertable into the gap 27 between runner 22 and the base 26 of the track 24. The screw 20, described above, may pass through an aperture 58 in the tab 56. As can be seen in FIG. 1, each of the end caps 48a, 48b, 48c and 48d closes one end of the gaps 46a and 46b and closes one end of the slideway cavity 34 of one of the tracks 24.

Four identical brackets 60a, 60b, 60c, and 60d are provided, as is best shown in the drawing in FIG. 1. Two of the brackets 60a and 60b are positioned along the track 24 of the above-described slat assembly 16a.

Two of the brackets 60c and 60d are positioned along the track 24 of the slat assembly 16b.

Referring now to FIGS. 2 through 6, the bracket 60a comprises a main body principally disposed above the track 24. The main body, best shown in FIGS. 2 and 3, may be a metallic casting or alternatively may be a plastic molding. The main body is a partial hollow frame having a top wall 62, a back wall 64, a partial front wall 66 and a pair of sidewalls 68. The sidewalls 68 and the back wall 64 are slightly trapezoidal in shape, each of the walls 64 and 68 being narrower near the top wall 62 than near the track 24. A trapezoidal aperture 70 is provided in the front wall 66. The specific exterior geometric shape and the contours of the walls 62, 64, 66, and 68 and the shape of the aperture 70 are matters of design preference and have only ornamental significance.

A small tab 72, shown in FIGS. 2, 3, 5 and 6, extends downwardly from each sidewall 68 of the main body of the bracket and into the slideway cavity 34. Each tab 72 has a neck portion 74 and an enlarged portion 76. The neck portion 74 is disposed in the gap 36 between the ribs 32a and 32b, as shown in FIG. 5. The enlarged portion 76 extends outwardly within the slideway cavity 34 from below the neck portion 74. Together, the two neck portions 74 of the tabs 72 prevent the bracket 60a from being rotated about any axis perpendicular to the longitudinal axis of the track 24. The enlarged portions 76 prevent removal of the bracket 60a from the track 24 except at the notched portion 39 (FIGS. 2 and 3) near the end of the track. Thus, the tabs 72 position the bracket 60a in the track 24 but allow the bracket to slide along the track to any desired location.

A hinged clamping member or door 80, shown in FIGS. 2 through 6, is provided for locking the bracket 60a in any one of the several possible positions along the track 24 determined by the detent apertures 30 (FIG. 4). The door 80 is preferably formed of the same material as the main body of the bracket 60a. The door 80 is pivotally fastened to the main body 64 by means of a pair of pins 84.

The door 80 has a substantially flat trapezoidal main portion. When the door 80 is pivoted to its fully upward position, shown in FIGS. 4 and 5, the main portion fits into the aperture 70 in the front wall 66. The outer surface 86 of the main portion is flush with the outer surface of the front wall 66. A handle 87 is formed at the top of the door 80 to allow it to be manually lowered and raised.

A pair of horizontal slots 88, one being shown in FIG. 6, are provided near the uppermost end 89 (FIG. 4) of the door 80, one on each side of the handle 87. A pair of ridges 90 (FIG. 6) are provided on the lower side of the top wall 66. The horizontal slots 88 cooperates with the ridges 90 to selectively secure the door 80 in the fully upward position.

Two spaced apart hooks or claws 96a and 96b (FIGS. 3 through 6) are provided at the lowermost end of the door 80. The end of each of the claws 96a and 96b moves into and out of one of the detent apertures 30 in the inner web 28a when the door 80 is pivoted. When the door is pivoted to the lower position, illustrated in FIG. 6, the bracket 60a may be moved along the track 24. When the door 80 is in the raised position, illustrated in FIGS. 4 and 5, the claws 96a and 96b prevent movement of the bracket 60a.

As previously stated, the brackets 60b through 60d are identical to the bracket 60a. Brackets 60c and 60d are mounted to the track 24 of the slat assembly 16*b* with the door 80 facing in the direction opposite that of the door 80 of the brackets 60*a* and 60*b*. This is done so that the handles 87 may be easily reached by the user. The claws 96*a* and 96*b* of the brackets 60*c* and 60*d* are pivoted into the detents 30 in the inner web 28*b*.

As best shown at FIG. 1, two transverse rails 100*a* and 100*b* extend between the upper portions of a pair of the brackets 60*a* through 60*d*. One of the rails 100*a* is extended between the brackets 60*a* and 60*c*. One end of the rail 100*a* is fastened to the bracket 60*a* on the slat assembly 16*a*. The other end of the rail 100*a* is fastened to the bracket 60*c* on the slat assembly 16*b*. Similarly, the other rail 100*b* is fastened at one of its ends to the second bracket 60*b* on the slat assembly 16*a* and is fastened at the other of its ends to the second bracket 60*d* on the slat assembly 16*b*. The details of the rails 100*a* and 100*b* and the details of the fastening means for the rails are not shown in the drawing since many useful variations are well known in the art.

As is readily apparent from the above description, the article carrier of the present invention has a small number of components. These components are rapidly and easily assembled and attached to a motor vehicle. The brackets are not easily vibrated loose. The transverse rails are easily moved closer together or farther apart depending on the size of the article being carried and then are rapidly and reliably secured in position. Additional transverse rails and brackets to support the rails may be added as needed. Furthermore, when the article carrier is not in use, the transverse rails and the brackets are easily removed near the ends of the track to prevent damage thereto or theft thereof. Removing the transverse rails reduces the wind noise often associated with rail-type article carriers and reduces the wind resistance that tends to decrease fuel economy.

The above constitutes a detailed description of the preferred embodiment of the present invention and is intended by way of example and not by way of limitation. Obvious modifications may be made within the scope of the appended claims. What is claimed as novel is as follows:

We claim:

1. An article carrier for mounting on a substantially flat exterior surface of a motor vehicle, said article carrier comprising:

a pair of longitudinal slats extending longitudinally along said surface, said slats being fastened to said surface in a parallel spaced apart relationship, each of said slats comprising a longitudinal base, a pair of longitudinal webs extending orthogonally from the edges of said base, and a pair of longitudinal ribs, each rib extending inwardly from the edge of one of said webs, one of the webs of each of said slats having a linear series of spaced apart detent apertures;

a bracket disposed along each of said slats and slidable therealong;

fastening means for each bracket selectively engageable with said one web at any preselected one of said detent apertures, said fastening means prohibiting movement of said bracket along said slat when said fastening means is engaged with said web;

locking means securing said fastening means in engagement with said web; and a rail disposed transversely between said slats and fastened at each end to one of said brackets;

and further wherein said bracket has an aperture therein, and wherein said fastening means comprises a clamping member having a claw, said clamping member being pivotally fastened to said bracket; and further wherein as said clamping member pivots, said claw is inserted into one of said detent apertures and said clamping member is inserted into aperture in said frame.

2. The article carrier of claim 1 wherein said bracket comprises a hollow frame having a plurality of walls; wherein said aperture is in one of said walls; and wherein the outside surface of said clamping member is even with the outside surface of said one wall when said clamping member is fully inserted into said aperture.

3. A bracket for supporting the transverse rail of an article carrier having a pair of spaced apart longitudinal slats, each slat defining a C-shaped longitudinal track and each slat having a linear series of spaced apart detents, said bracket comprising a main body disposed at least partly outside of said track and slideably secured to said track; means securing one end of said transverse rail to said main body; fastening means movably fastened to said bracket and having a portion thereof selectively movable into engagement with any preselected one of said detents, thereby inhibiting movement of said bracket along said track; and locking means selectively locking said fastening means in engagement with said aperture; said fastening means comprises a clamping member pivotally fastened to said main body and at least one claw extending from said clamping member and pivotable into any preselected aperture; and further wherein said clamping member has two claws extending therefrom, said claws being pivotable into two preselected adjacent apertures.

4. The bracket of claim 3 further comprising a cavity in said main body wherein a portion of said fastening means is within said cavity when said fastening means engages one of said detents and further wherein said locking means comprises a surface on said clamping member and a complementary mating internal surface in said cavity resisting relative motion therebetween.

5. The bracket of claim 3 wherein said main body comprises a hollow partial frame having a top wall, a rear wall, two sidewalls and a front wall, said front wall having an aperture; wherein said fastening means has a flat portion; and wherein said clamping member pivots into said aperture.

* * * * *